United States Patent
Xing et al.

(10) Patent No.: US 6,844,109 B2
(45) Date of Patent: Jan. 18, 2005

(54) LI-ION AND/OR LI-ION POLYMER BATTERY WITH EDGE PROTECTORS

(75) Inventors: Xuekun Xing, Richmond Heights, OH (US); Frough K. Shokoohi, Kirtland, OH (US); Wanjun Fang, Mentor, OH (US); Hiroki Sugiura, Beachwood, OH (US)

(73) Assignee: NGK Spark Plug Co., Ltd. (JP)

( * ) Notice: Subject to any disclaimer, the term of this patent is extended or adjusted under 35 U.S.C. 154(b) by 352 days.

(21) Appl. No.: 10/023,510

(22) Filed: Dec. 18, 2001

(65) Prior Publication Data

US 2003/0113618 A1 Jun. 19, 2003

(51) Int. Cl.[7] .......................... H01M 2/14; H01M 6/46; H01M 6/12
(52) U.S. Cl. ................... 429/129; 429/153; 429/162
(58) Field of Search ................ 429/151, 153, 429/162, 163, 176, 178, 181, 129

(56) References Cited

U.S. PATENT DOCUMENTS

| | | | |
|---|---|---|---|
| 4,582,767 A | 4/1986 | Morioka et al. ............ 429/121 |
| 4,937,154 A * | 6/1990 | Moses et al. ................. 429/94 |
| 5,456,813 A | 10/1995 | Grange-Cossou et al. .. 204/284 |
| 5,466,545 A | 11/1995 | Chamberlain et al. ........ 429/99 |
| 5,487,958 A * | 1/1996 | Tura ............................ 429/151 |
| 5,556,722 A | 9/1996 | Narukawa et al. .......... 429/163 |
| 5,587,253 A * | 12/1996 | Gozdz et al. ............... 429/316 |
| 5,631,101 A | 5/1997 | Amero, Jr. ................... 429/99 |
| 5,635,312 A | 6/1997 | Yanagisawa et al. ......... 429/94 |
| 5,650,243 A | 7/1997 | Ferment ..................... 429/162 |
| 5,654,114 A * | 8/1997 | Kubota et al. .............. 429/338 |
| 5,882,822 A | 3/1999 | Iida et al. ................... 429/235 |
| 5,929,600 A | 7/1999 | Hasegawa ................... 320/112 |
| 5,942,352 A | 8/1999 | Neil et al. .................... 429/96 |
| 6,045,946 A | 4/2000 | Maggert et al. ............ 429/211 |
| 6,063,519 A * | 5/2000 | Barker et al. ............... 429/161 |
| RE36,843 E | 8/2000 | Lake et al. ................. 429/124 |
| 6,102,112 A | 8/2000 | Herzl .......................... 165/185 |
| 6,106,973 A | 8/2000 | Sonozaki et al. ........... 429/162 |
| 6,371,996 B1 * | 4/2002 | Takayama et al. ......... 29/623.2 |

FOREIGN PATENT DOCUMENTS

| | | | |
|---|---|---|---|
| JP | 9-293499 | * 11/1997 | .......... H01M/10/40 |
| JP | 11-297299 | 10/1999 | ............ H01M/2/18 |

* cited by examiner

Primary Examiner—Patrick Ryan
Assistant Examiner—Julian Mercado
(74) Attorney, Agent, or Firm—Kusner & Jaffe

(57) ABSTRACT

A Li-ion and/or Li-ion polymer battery, comprised of a plurality of battery cells, each battery cell comprised of at least one cathode section, an anode section and at least one separator layer disposed between the anode section and the at least one cathode section. A first, planar metal mesh layer is disposed within the anode section, the first metal mesh layer having a coplanar tab extending beyond the separator layer to define a negative lead. A second, planar metal mesh layer is disposed within the cathode section, the second metal mesh layer having a coplanar tab extending beyond the separator layer to form a positive lead. A plurality of reinforcing bands are wrapped around the peripheral edges of the battery cells securing the battery cells together.

15 Claims, 6 Drawing Sheets

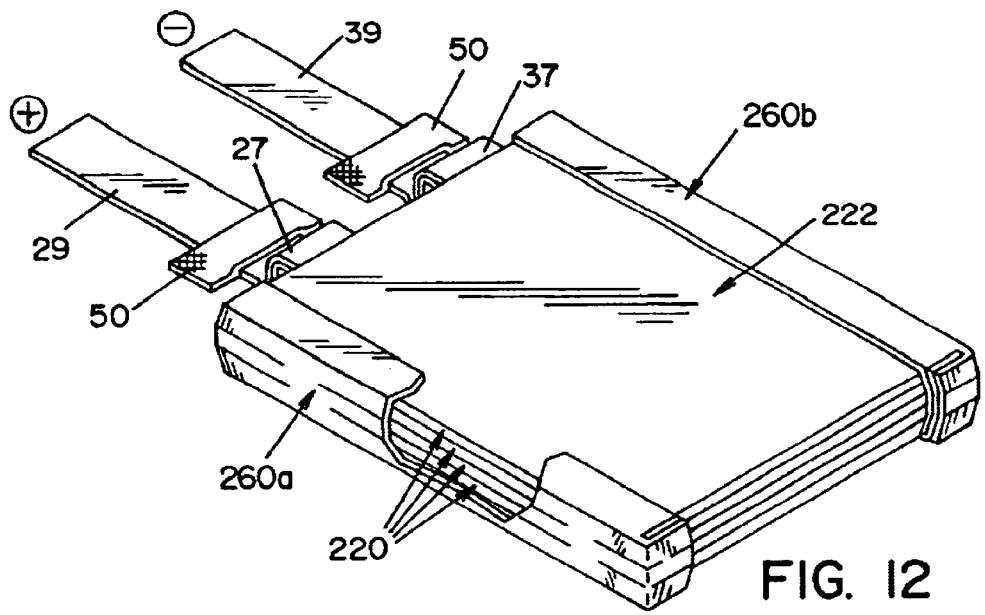
FIG. 12
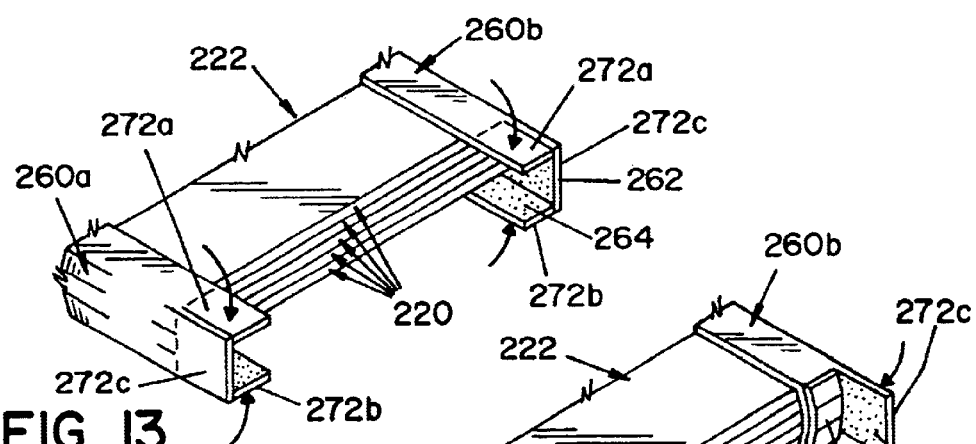
FIG. 13
FIG. 14
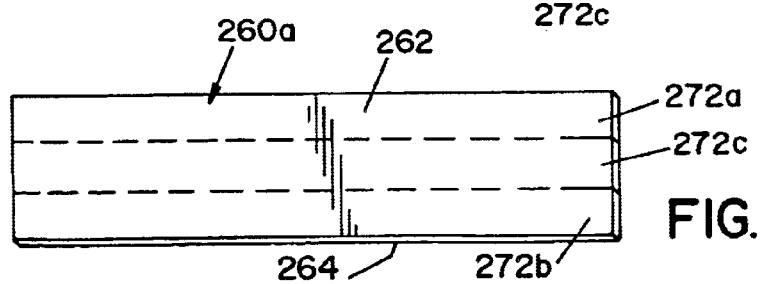
FIG. 15

LI-ION AND/OR LI-ION POLYMER BATTERY WITH EDGE PROTECTORS

FIELD OF THE INVENTION

The present invention relates generally to Li-ion and/or Li-ion polymer batteries, and more particularly, to a Li-ion and/or Li-ion polymer battery that is reinforced to maintain the alignment and structural integrity of an assembly of battery cells, and to facilitate packaging of the battery.

BACKGROUND OF THE INVENTION

Broadly stated, a Li-ion and/or Li-ion polymer cell is generally comprised of a plurality of layered sections, namely, an anode section, a cathode section and a separator layer that is disposed between the anode section and the cathode section. A layer of a first conductive material is disposed within or in contact with the anode section. This layer forms what is conventionally referred to as an "anode current collector." A second layer of a conductive material is disposed within or in contact to the cathode section to form a "cathode current collector." It is conventionally known to use metal screens or meshes or foils to form the aforementioned current collectors. Typically, a copper mesh is used to form the anode current collector, and an aluminum metal mesh is used to form the cathode current collector.

Assignee's prior U.S. Pat. No. 6,145,280, entitled: FLEXIBLE PACKAGING FOR POLYMER ELECTROLYTIC CELL AND METHOD OF FORMING SAME, discloses a method of packaging a Li-ion and/or Li-ion polymer cell of the type described above in a flexible laminate package. The disclosed method of packaging includes forming a sleeve from a sheet of a flexible laminate and inserting a cell into one end of the sleeve. The ends of the laminate sleeve are ultimately sealed to form a flexible package enclosing the cell.

Since the laminate sleeve is dimensioned to snuggly fit around the cell, care must be used in inserting the cell into the sleeve so as not to snag or catch the ends or edges. In this respect, catching or snagging an edge or end of the cell may cause shifting and misalignment of the layers of the battery cell, potentially affecting the performance of the battery.

Further, flexible packaging of the type heretofore described, allows some sliding or shifting of the cell within the package. This shifting or sliding can cause displacement or movement of the battery layers within the packaging, that may cause shorting of the battery.

The present invention overcomes these and other problems and provides a cell having reinforcing bands disposed along the periphery thereof to maintain the alignment and structural integrity of a battery cell assembly, and to protect the ends and edges of the battery cell assembly during packaging and use.

SUMMARY OF THE INVENTION

In accordance with a preferred embodiment of the present invention, there is provided a Li-ion and/or Li-ion polymer cell, comprised of a cathode section, an anode section and a separator layer disposed between the anode section and the cathode section. A first, planar metal mesh layer is disposed within the anode section, the first metal mesh layer having a coplanar tab extending beyond the separator layer to define a negative lead. A second, planar metal mesh layer is disposed within the cathode section, the second metal mesh layer having a coplanar tab extending beyond the separator layer to form a positive lead. A plurality of reinforcing bands are wrapped around the peripheral edges of the cell securing the cathode section, the anode section and the separator together.

It is an object of the present invention to provide an electrolytic battery with a flexible laminate package.

It is another object of the present invention to provide a battery comprised of a plurality of layered cells, wherein the cells are less susceptible to misalignment or sliding movement during fabrication and use.

Another object of the present invention is to provide a battery as described above having reinforcing bands wrapping at the edges and corners of the battery to prevent displacement of the cell layers forming the battery.

A still further object of the present invention is to provide a battery as described above that reduces the likelihood of shorting caused by edges of cells penetrating a packaging laminate.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 12 is a perspective view of a multi-cell battery assembly, showing a long, continuous band securing each lateral edge of the battery assembly;

FIGS. 13 and 14 are perspective views of one end of the battery assembly shown in FIG. 12, illustrating how the corners of the battery assembly are wrapped by the bands; and FIG. 15 is a view of the long, continuous band in a planar configuration, showing the end of the band slit to allow it to be wrapped about the corners of the battery assembly as shown in FIGS. 13 and 14.

DETAILED DESCRIPTION OF PREFERRED EMBODIMENT

Figure 1:
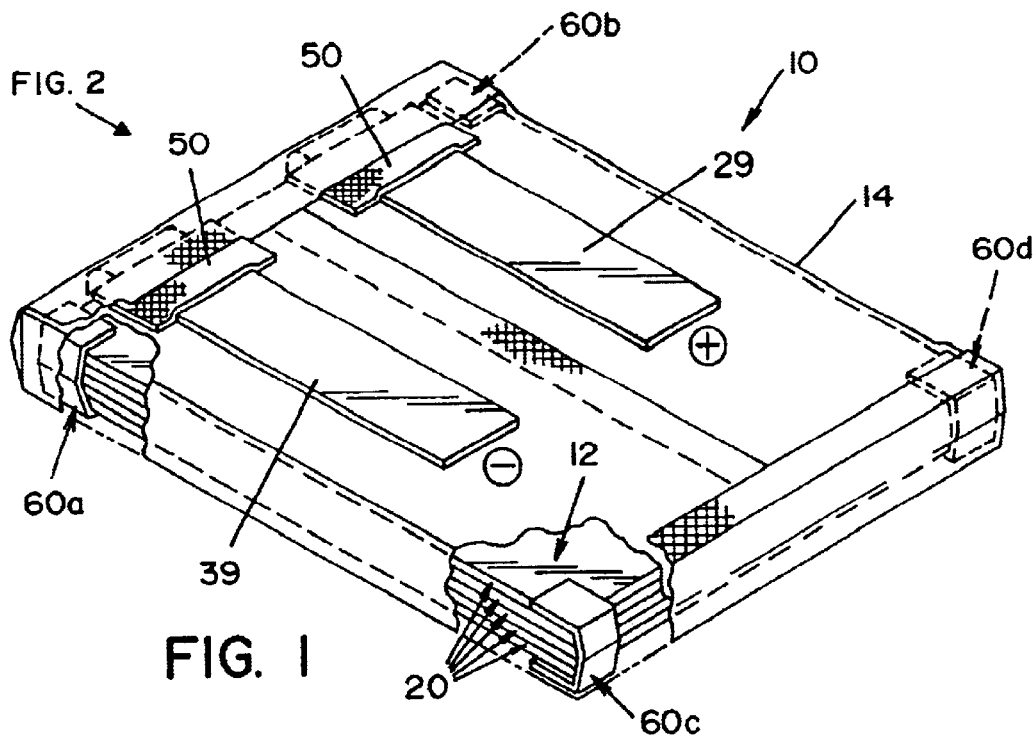
FIG. 1 is a perspective view of an electrolytic battery within a flexible package illustrating an embodiment of the present invention.

Referring now to the drawings wherein the showings are for the purpose of illustrating a preferred embodiment of the invention only, and not for the purpose of limiting same, FIG. 1 shows a battery 10 illustrating a preferred embodiment of the present invention. Battery 10 may be a primary (non-rechargeable) battery or a secondary (rechargeable) battery. Battery 10 is formed of a battery assembly 12 contained within a package 14 (shown partially sectioned in the drawings) that is formed of a flexible laminate material. In the embodiment shown in FIGS. 1–9, battery assembly 12 is preferably a polymer electrolytic, lithium-based electrochemical cell.

Figure 1A:
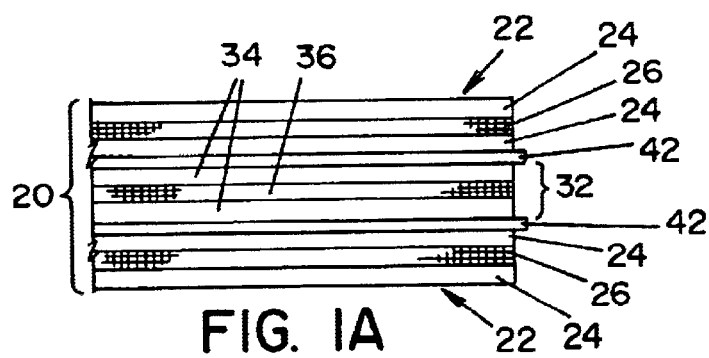
FIG. 1A is an enlarged, sectional view showing the construction of a bi-cell.

In the embodiment shown, battery assembly 12 is comprised of a plurality of battery cells 20. Each cell 20 is comprised of at least one cathode section 22 and an anode section 32. In this respect, cell 20 may be a single cell comprised of a single cathode section 22 and a single anode section 32, having a separator layer 42 therebetween, or a bi-cell comprised of two cathode sections 22 having an anode section 32 therebetween with a separator layer 42 disposed between anode section 32 and each cathode section 22, a bi-cell being illustrated in FIG. 1A. Each cathode section 22 is comprised of two layers 24 of a cathode film. The film-forming cathode layer 24 is preferably comprised of a lithiated metal oxide active material, a conductive material and a binder material. A current collector 26 formed of a metal screen, mesh or foil is provided between cathode layers 24. Current collector 26 includes an outward extending tab or strip 28.

Anode section 32 is comprised of two layers 34 of an anode film having a current collector 36 disposed therebetween. The film-forming anode layers 34 are preferably comprised of a carbon active material, a conductive material and a binder material. Current collector 36 includes an outward extending tab or strip 38 that defines the negative lead of battery 10, best seen in FIGS. 1 and 3.

Between anode section 32 and cathode section 22, a separator film 42 is disposed. Separator film layer 42 is preferably formed of a polymeric matrix containing an ionically conductive electrolyte.

Figure 2:
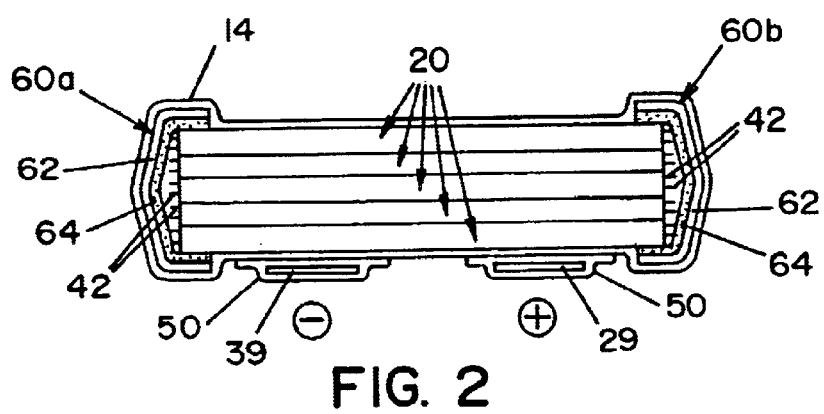
FIG. 2 is an end view of the battery shown in FIG. 1 with the packaging at the end of the battery removed.
Figure 3:
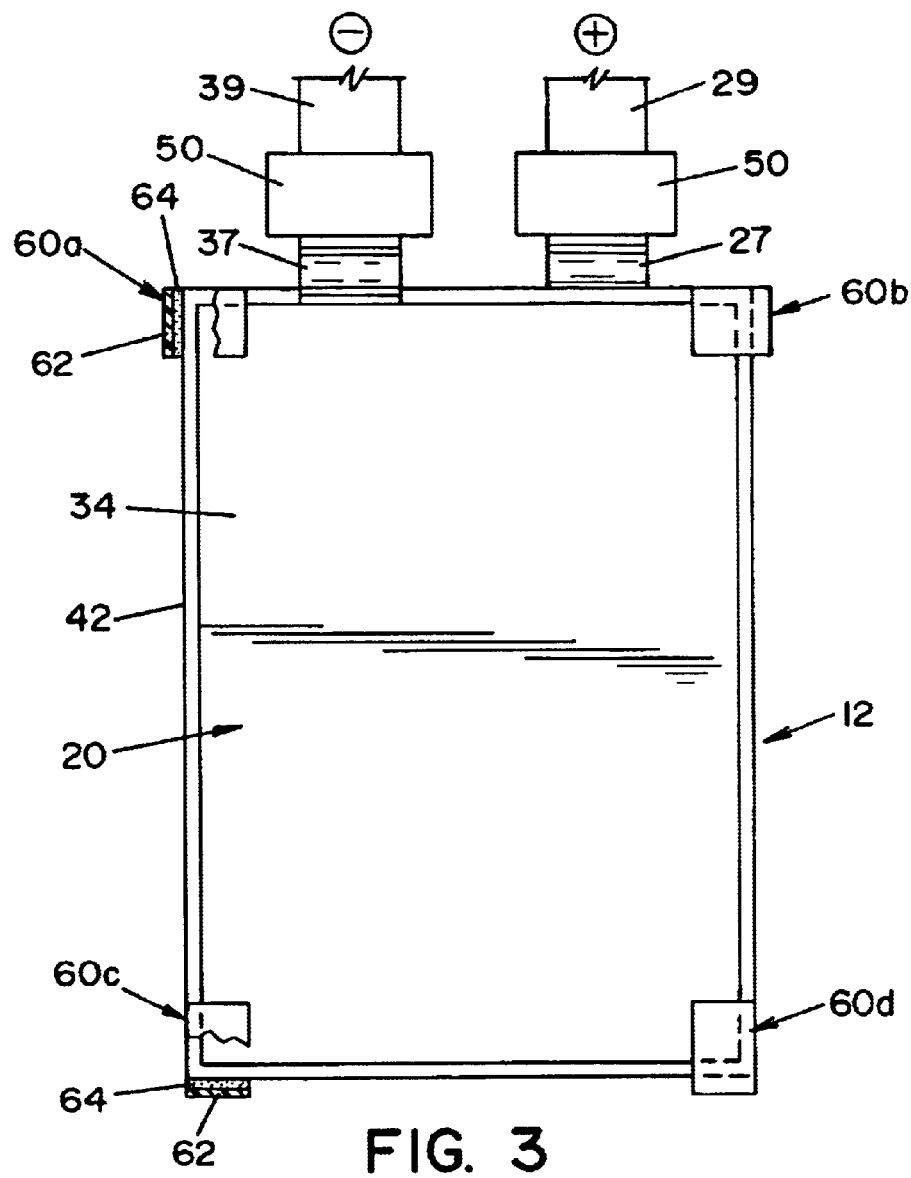
FIG. 3 is a top plan view of the battery assembly showing bands securing the corners thereof.

Each cathode layer 24 preferably has a thickness of about 50 μm to about 300 μm, preferably about 100 μm to about 200 μm. Each anode layer 34 has a thickness of about 50 μm to about 300 μm, preferably about 100 μm to about 200 μm. Each separator layer 42 has a thickness of about 10 μm to about 75 μm, preferably about 15 μm to about 35 μm. Current collectors 26, 36 are preferably formed of a metal mesh or screen having a thickness of about 25 μm to about 50 μm. The overall thickness of battery assembly 12 is about 800 μm or less, and preferably about 500 μm or less. In multi-cell battery 10, a plurality of cathode current collector tabs and anode current collector tabs (not seen in FIGS. 1–9) are joined together by welding into a cathode tab weldment 27 and an anode tab weldment 37, respectively, as best seen in FIG. 3. A cathode battery lead 29 extends from cathode tab weldment 27, and an anode battery lead 39 extends from anode tab weldment 37.

In the embodiment shown, a protective sleeve 50 is wrapped around battery leads 29, 39. Protective sleeves 50 are disposed about battery leads 29, 39 such that sleeves 50 electrically isolates leads 29, 39 from the laminate forming package 14 in the vicinity where battery leads 29, 39 extend through package 14. Each protective sleeve 50 may be formed of two separate strips of material applied to the opposite sides of a battery lead, but more preferably is comprised of a single strip of material that is wrapped around a battery lead, as illustrated in FIGS. 1 and 2.

Figure 4:
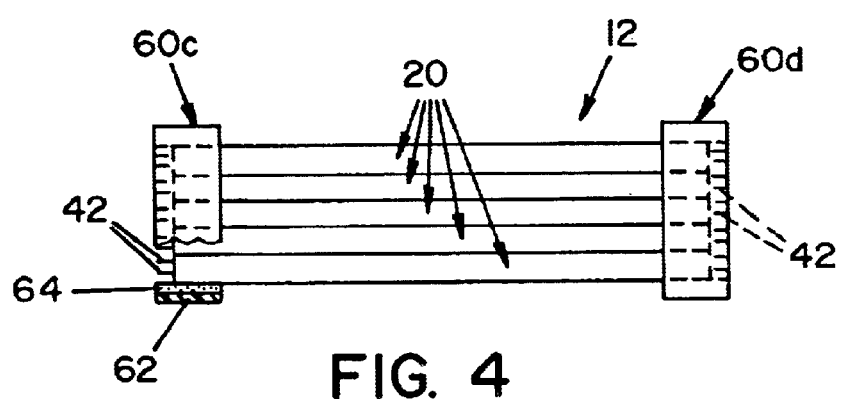
FIG. 4 is an elevational view of the bottom end of the battery assembly shown FIG. 3.

As best seen in FIGS. 3 and 4, battery assembly 12 includes reinforcing bands 60, designated 60a, 60b, 60c and 60d, wrapped about the edges of battery assembly 12. Bands 60a, 60b, that are disposed at the lengthwise end of battery assembly 12 where tabs 28, 38 extend therefrom, are wrapped widthwise around the sides of battery assembly 12 at the corners thereof, as best seen in FIG. 2. Bands 60c, 60d, that are disposed at the opposite end of battery assembly 12, are wrapped lengthwise around the ends of battery assembly 12 at the corners thereof. Bands 60a, 60b, 60c and 60d essentially reinforce the corners of battery assembly 12 so as to maintain the alignment and structural integrity of cells 20 forming battery 10.

Bands 60, i.e., 60a, 60b, 60c and 60d, are preferably comprised an outer polymer layer 62 and an inner adhesive layer 64. Outer layer 62 is preferably formed of a tough, thin polymer material having high dielectric properties and that is inert to the components forming battery assembly 12. Various plastic tapes find advantageous application in forming outer layer 62. Such plastic materials may include polyimide, polyester, polypropylene, PTFE and the like. Polymeric outer layer 62 preferably has a thickness of about 0.0005 inches to about 0.0015 inches. (In the drawings, the thickness of polymeric outer layer 62 and adhesive layer 64 has been exaggerated for the purpose of illustration). The width of protective layer 62 is based upon the battery design.

Adhesive layer 64 is preferably formed of a non-conductive, thermosetting polymer, sealing material. An adhesive material, such as silicone and acrylate, finds advantageous use as adhesive layer 64 in that this material is stable in the environment of a lithium ion polymer battery. Other adhesive materials such as rubber may also be used. The thickness of adhesive layer 64 is about 0.0005 inches to about 0.0015 inches. The total thickness of reinforcing bands 60 is preferably about 0.0010 inches to about 0.0030 inches.

Bands 60a, 60b, 60c and 60d are essentially flexible strips that are wrapped around the corners of battery assembly 12. Inner adhesive layer 64 is preferably formed of a pressure-sensitive material, wherein bands 60 may be applied to battery assembly 12 in a manner similar to applying conventional adhesive tape. Adhesion layer 64 adheres bands 60 to the layer forming battery assembly 12.

In the embodiment shown, each band 60a, 60b, 60c and 60d is formed from continuous strips of polymer outer layer 62 and a continuous adhesive layer 64. As will be appreciated by those skilled in the art, bands 60a, 60b, 60c and 60d may be non-continuous, i.e., porous or perforated, to allow the flow of electrolyte therethrough. However, bands 60 having a continuous polymer outer layer 64 are preferred because of the greater stiffness and rigidity provided thereby and to provide a smooth, uninterrupted outer surface that is less susceptible to "snagging" or "catching" on outer layers of material during assembly, as shall hereinafter be described.

Figure 5:
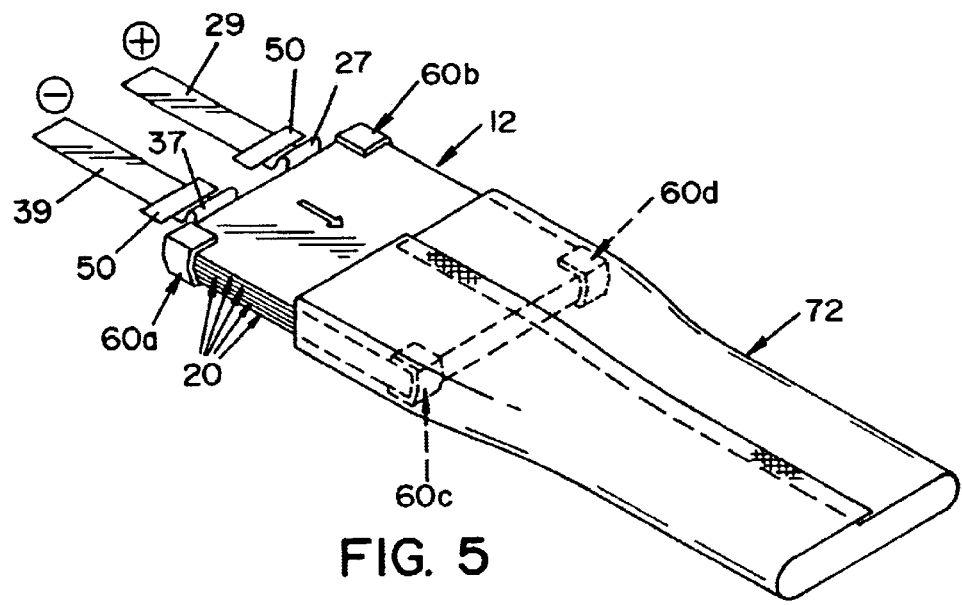
FIG. 5 is a perspective view showing the battery assembly being inserted into the outer package.

Referring now to FIG. 5, battery assembly 12 is shown being inserted into a packaging sleeve 72, according to a method disclosed in prior U.S. Pat. No. 6,145,280, entitled:

FLEXIBLE PACKAGING FOR POLYMER ELECTROLYTIC CELL AND METHOD OF FORMING SAME, the disclosure of which is expressly incorporated herein by reference. As illustrated in FIG. 5, battery assembly 12 is inserted into sleeve 72 by inserting the free end (i.e., the end without tabs 28, 38) into one end of sleeve 72. Bands 60c, 60d on the free end of battery assembly 12 essentially provide a guide and protection to the corners of battery assembly 12, as battery assembly 12 slides into sleeve 72. The lengthwise orientation of bands 60c, 60d basically guides and directs sleeve 72 to the top and bottom surfaces of battery assembly 12 and prevents cells 20 of battery assembly 12 from snagging or catching onto sleeve 72.

Once within sleeve 72, sleeve 72 is preferably sealed and packaged according to aforementioned U.S. Pat. No. 6,145,280. Bands 60a, 60b, 60c and 60d essentially maintain the structural integrity of battery assembly 12 and prevent separation and displacement of the respective sections and layers of battery assembly 12, and provide additional structural rigidity to battery assembly 12.

As will be appreciated by those skilled in the art, battery assembly 12 may also be inserted into a "butter-cup" package (not shown), as is conventionally known. Bands 60a, 60b, 60c and 60d prevent separation and displacement of the respective sections and layers during insertion of battery assembly 12 into a butter-cup type package.

Figure 6:
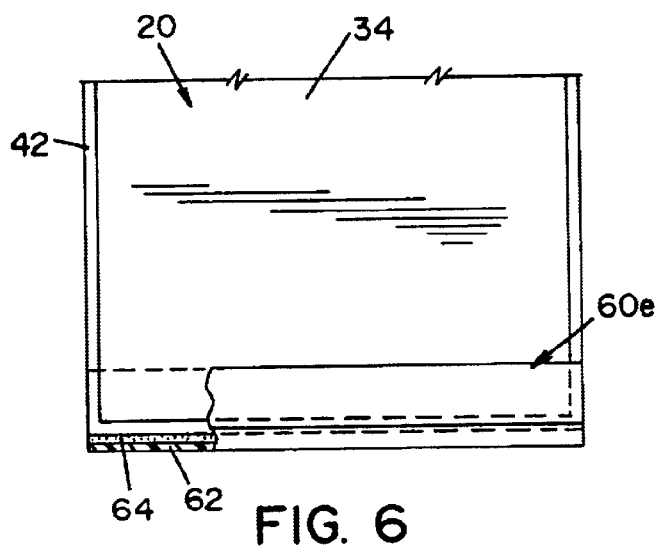
FIG. 6 is a top plan view of one end of a battery assembly illustrating an alternate embodiment of the present invention.
Figure 7:
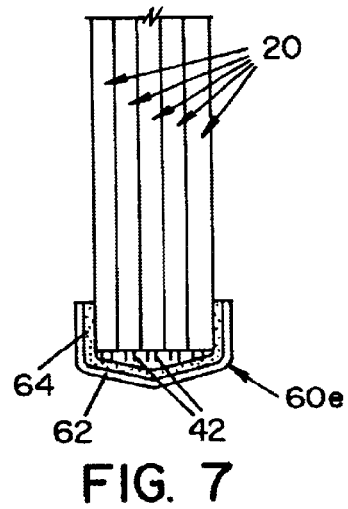
FIG. 7 is an enlarged, partially sectioned, side view of the end of a battery assembly shown in FIG. 6.

FIGS. 6 and 7 show an alternate embodiment of the present invention wherein a single band, designated 60e, extends along the entire edge of the free end of battery assembly 12. Band 60e is comprised of the same outer polymer layer 62 and inner adhesive layer 64, as heretofore described. As best seen in FIG. 7, band 60e is wrapped lengthwise so that battery assembly 12 is inserted within sleeve 72, the entire leading edge of battery assembly 12 in the direction of movement of battery assembly 12 is covered and protected by band 60e.

Figure 8:
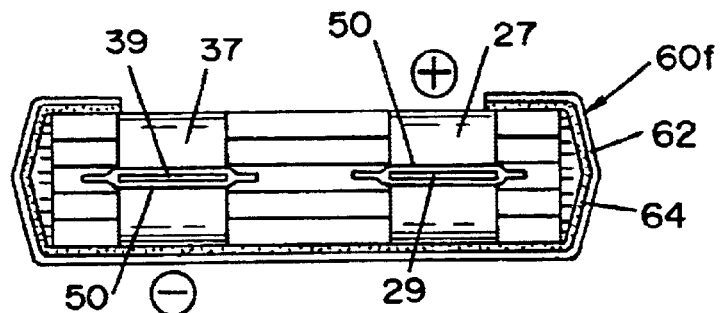
FIG. 8 is an end view of a battery assembly illustrating an alternate embodiment of the present invention.
Figure 9:
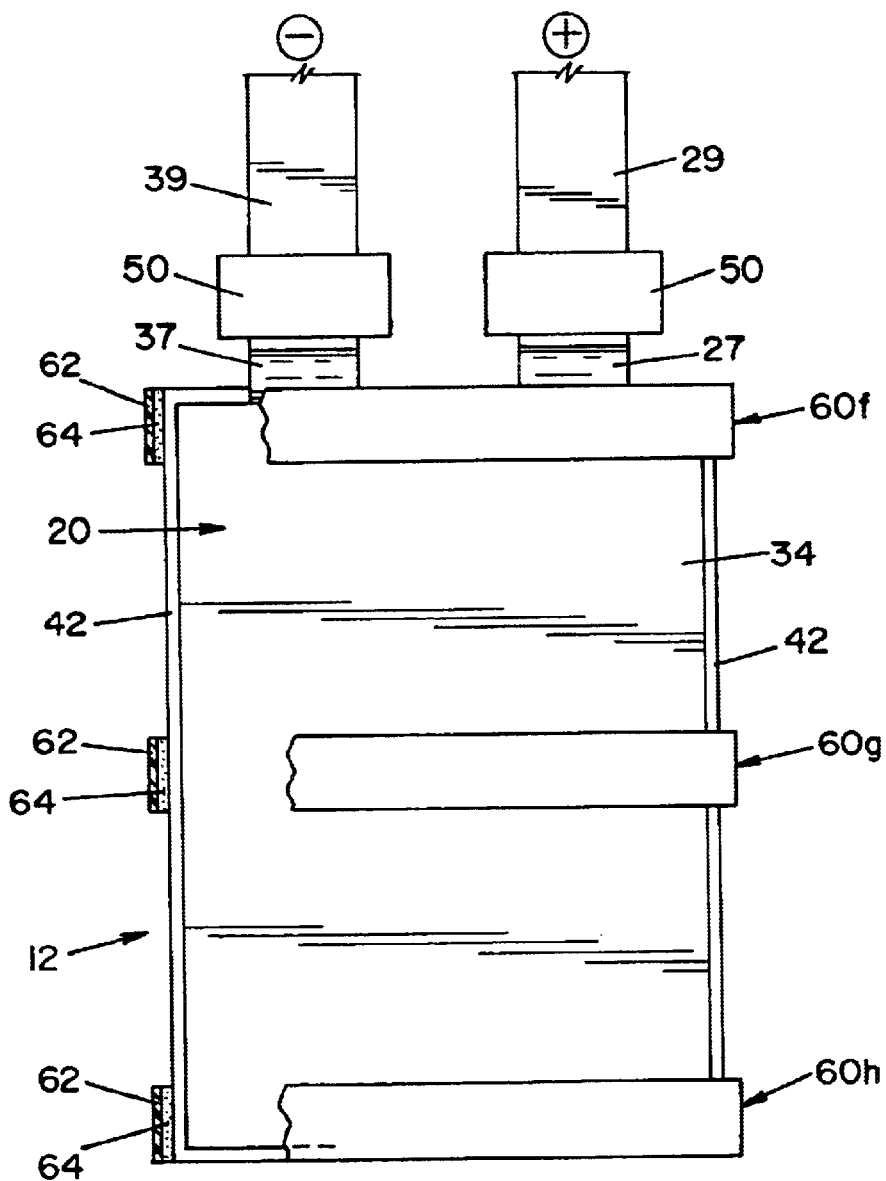
FIG. 9 is a bottom plan view of the battery assembly shown in FIG. 8.

FIGS. 8 and 9 show a still further embodiment of the present invention wherein elongated bands, designated 60f, 60g and 60h are wrapped widthwise around battery assembly 12. Bands 60f, 60g and 60h are comprised of the same outer polymer layer 62 and inner adhesive layer 64, as heretofore described. Bands 60f, 60g and 60h are dimensioned to surround most, but not all, of the periphery of battery assembly 12. As shown in FIG. 9, bands 60f and 60h are disposed at the longitudinal ends of battery assembly 12, and band 60g is disposed midway along the length of battery assembly 12. Bands 60f, 60g and 60h provide extensive wrapping of battery assembly 12 to increase the structural rigidity of battery assembly 12.

Figure 10:
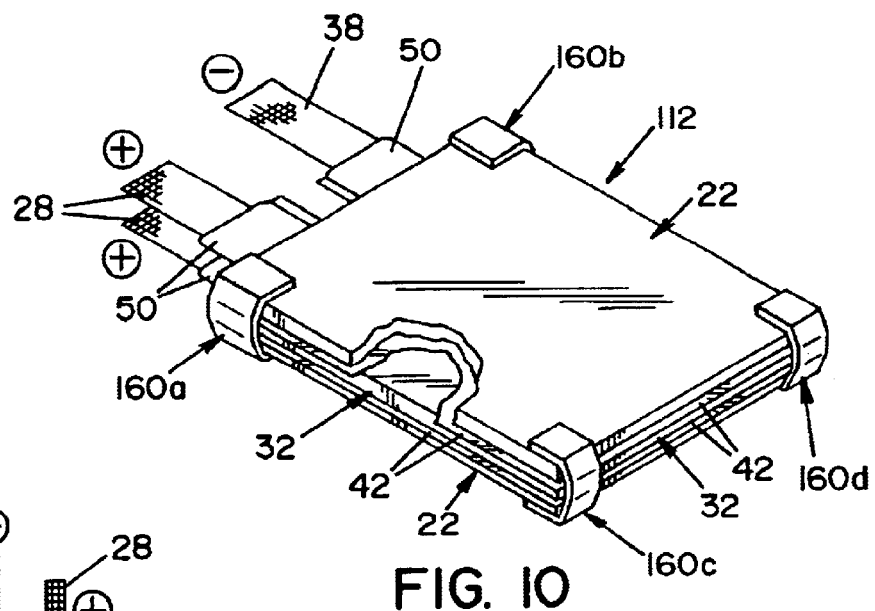
FIG. 10 is a perspective view of a bi-cell battery assembly comprised of two cathode sections and an anode section, showing bands securing the corners of the battery assembly.
Figure 11:
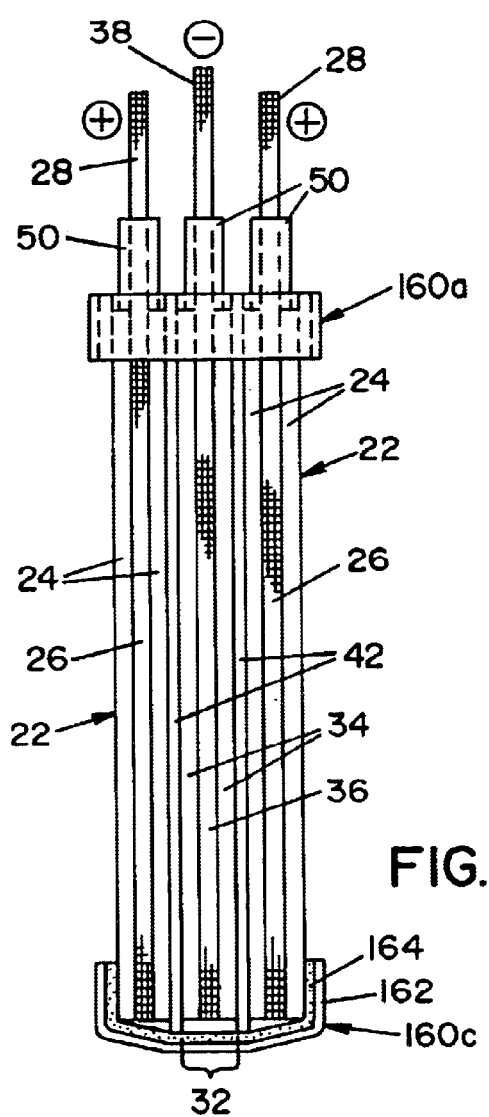
FIG. 11 is an enlarged side view of the battery assembly shown in FIG. 10.

FIGS. 10 and 11 show yet another embodiment of the present invention, wherein elongated bands, designated 160a, 160b, 160c and 160d are wrapped about the edges of a battery assembly 112. Battery assembly 112 is comprised of an anode section 32 that is disposed between two cathode sections 22. Such a structure is conventionally referred to as a "bi-cell." Cathode sections 22 and anode section 32 are like those heretofore described. In this respect, each cathode section 22 is comprised of two layers 24 of cathode film having a current collector 26 disposed therebetween. Anode section 32 is comprised of two layers 34 of anode film having current collector 36 disposed therebetween. Cathode current collector 26 has an outward extending tab 28 and anode current collector 36 has an outward extending tab 38. Each tab 28, 38 has a protective sleeve 50 therearound, as heretofore described. Separator films 42 are disposed between anode section 32 and each cathode section 22.

Reinforcing bands 160a, 160b, 160c and 160d are wrapped about the edges of battery assembly 112. Bands 160a, 160b are wrapped widthwise around the sides of battery assembly 112 where tabs 28, 38 extend therefrom. Bands 160c, 160d are wrapped lengthwise around the ends of battery assembly 112.

Bands 160a, 160b, 160c and 160d, like bands 60, i.e., 60a, 60b, 60c and 60d, as heretofore described, are formed of an outer polymer layer 162 and an inner layer 164. Layers 162 and 164 are preferably formed of the same materials as heretofore described. Bands 160a, 160b, 160c and 160d reinforce the corners of battery assembly 112 to prevent separation and/or displacement of the respective components of battery assembly 112.

FIGS. 12–15 show still another embodiment of the present invention, wherein long bands, designated 260a, 260b are wrapped about the lateral edges of a battery assembly 222. Battery assembly 222 is a plurality of bi-cells 220, as heretofore described, wherein each bi-cell 220 is comprised of an anode section 32 that is disposed between two cathode sections 22. In this respect, battery assembly 222 is comprised of similar components as the bi-cells described in the embodiments illustrated in FIGS. 1–11.

Bands 260a, 260b, like bands 60a, 60b, 60c and 60d and bands 160a, 160b, 160c and 160d, as heretofore described, are formed of an outer polymer layer 262 and an inner layer 264. Layers 262 and 264 are preferably formed of the same materials as heretofore described.

The ends of bands 260a, 260b are slit to form tabs 272a, 272b and 272c, as best seen in FIG. 15, that shows band 260a in planar configuration. Bands 260a and 260b are dimensioned to be wrapped around the lateral edges of battery assembly 222, as shown in FIG. 12. Tabs 272a, 272b and 272c are dimensioned to be wrapped around the corners of battery assembly 222, as illustrated in FIGS. 13 and 14. In the embodiment shown, tabs 272a, 272b and 272c are formed only at one end of bands 260a, 260b. As shown in FIG. 12, tabs 272a, 272b and 272c are disposed to wrap around the longitudinal end of battery assembly 222 that is opposite to the end where cathode leads 28 and anode lead 38 project from battery assembly 222. As will be appreciated by those skilled in the art, tabs 272a, 272b and 272c may be formed at both ends of each reinforcing band 260a, 260b and be wrapped around all four corners of battery assembly 222.

The foregoing is a description of specific embodiments of the present invention. It should be appreciated that these embodiments are described for purposes of illustration only, and that numerous alterations and modifications may be practiced by those skilled in the art without departing from the spirit and scope of the invention. For example, the reinforcing bands may be applied to non-rectangular shapes. It is intended that all such modifications and alterations be included insofar as they come within the scope of the invention as claimed or the equivalents thereof.

Having described the invention, the following is claimed:

1. A Li-ion and/or Li-ion polymer battery, comprised of:
    a battery assembly comprised of a plurality of battery cells, each battery cell comprised of:
        at least one cathode section;
        at least one anode section;
        a separator layer disposed between said anode section and said cathode section;
        a first, planar metal mesh layer within said anode section, said first metal mesh layer having a coplanar tab extending beyond said separator layer to define a negative lead; and a second, planar metal mesh layer within said cathode section, said second metal mesh layer having a coplanar tab extending beyond said separator layer to form a positive lead; and a plurality of reinforcing bands wrapped around the peripheral edges of said battery assembly securing said plurality of battery cells together, wherein each band is comprised of an outer flexible polymer layer and an inner adhesive layer and said inner adhesive layer is between said outer polymer layer and said peripheral edges of said battery cells and each band captures the entire assembly.

2. A Li-ion and/or Li-ion polymer battery as defined in claim 1, wherein said polymer layer has a thickness between about 0.0005 inches and about 0.0015 inches.

3. A Li-ion and/or Li-ion polymer battery as defined in claim 2, wherein said outer polymer layer is comprised of polyimide.

4. A Li-ion and/or Li-ion polymer battery as defined in claim 2, wherein said outer polymer layer is comprised of polyester.

5. A Li-ion and/or Li-ion polymer battery as defined in claim 1, wherein said adhesive layer is comprised of silicone.

6. A Li-ion and/or Li-ion polymer battery as defined in claim 1, wherein said adhesive layer is acrylate.

7. A Li-ion and/or Li-ion polymer battery as defined in claims 5 or 6, wherein said adhesive layer has a thickness between about 0.0005 inches and about 0.0015 inches.

8. A Li-ion and/or Li-ion polymer battery as defined in claim 1, wherein each of said reinforcing bands has a thickness between about 0.0015 and about 0.003 inches.

9. A Li-ion and/or Li-ion polymer battery as defined in claim 1, wherein said cell is generally rectangular in shape and has a lengthwise end with said tabs extending therefrom and said end with no tabs, said battery including at least one band on said end with no tabs, said band being wrapped around said end in a lengthwise direction.

10. A Li-ion and/or Li-ion polymer battery as defined in claim 9, wherein said band extends along the entire end of said battery.

11. A Li-ion and/or Li-ion polymer battery as defined in claim 1, wherein said cell is generally rectangular in shape and includes four (4) bands wrapped around the corners of said battery.

12. A Li-ion and/or Li-ion polymer battery as defined in claim 1, wherein said bands are wrapped widthwise around said battery.

13. A Li-ion and/or Li-ion polymer battery as defined in claim 1, wherein each of said battery cells includes a second cathode section and a second separator layer, said second separator layer disposed between said second cathode section and said anode section.

14. A Li-ion and/or Li-ion polymer battery as defined in claim 1, wherein said reinforcing bands extend along the entire lateral edges of said battery.

15. A Li-ion and/or Li-ion polymer battery as defined in claim 14, wherein said bands have tabs at least at one end thereof that wrap around a longitudinal edge of said battery.

* * * * *